(12) United States Patent
VanValkenburgh et al.

(10) Patent No.: US 6,899,208 B2
(45) Date of Patent: May 31, 2005

(54) ROTARY DAMPER

(75) Inventors: Charles Nicholas VanValkenburgh, Huntsville, AL (US); John Harrison Burrow, Fayetteville, TN (US)

(73) Assignee: Charles N. VanValkenburgh, Huntsville, AL (US)

( * ) Notice: Subject to any disclaimer, the term of this patent is extended or adjusted under 35 U.S.C. 154(b) by 88 days.

(21) Appl. No.: 10/318,815

(22) Filed: Dec. 13, 2002

(65) Prior Publication Data

US 2003/0111308 A1 Jun. 19, 2003

Related U.S. Application Data

(60) Provisional application No. 60/339,801, filed on Dec. 17, 2001.

(51) Int. Cl.[7] .................................................. F16F 9/14
(52) U.S. Cl. ....................................... 188/309; 188/310
(58) Field of Search ................................. 251/343, 345, 251/347, 264, 266, 273, 267; 188/266.3, 290, 308, 309, 310, 316

(56) References Cited

U.S. PATENT DOCUMENTS

| | | | | |
|---|---|---|---|---|
| 933,076 A | * | 9/1909 | Houdaille | 188/310 |
| 1,256,215 A | * | 2/1918 | Eycleshymer | 251/266 |
| 1,294,112 A | * | 2/1919 | Keeler et al. | 251/266 |
| 1,540,341 A | * | 6/1925 | Kirby | 188/280 |
| 1,904,040 A | * | 4/1933 | Chapin | 188/290 |
| 1,976,796 A | * | 10/1934 | Milner | 251/266 |
| 2,021,428 A | * | 11/1935 | Peo | 188/278 |
| 2,043,489 A | * | 6/1936 | Peo | 188/309 |
| 2,301,318 A | * | 11/1942 | Peo | 188/277 |
| 2,329,923 A | * | 9/1943 | Magrum | 188/284 |
| 2,819,062 A | * | 1/1958 | Tack | 280/124.105 |
| 5,901,821 A | * | 5/1999 | Hanawa | 188/277 |
| 6,082,507 A | * | 7/2000 | Forster | 188/296 |
| 6,318,522 B1 | * | 11/2001 | Johnston et al. | 188/267.2 |
| 6,536,565 B2 | * | 3/2003 | Oliver et al. | 188/290 |

* cited by examiner

Primary Examiner—Thomas Williams

(57) ABSTRACT

A damping device utilizing a viscous fluid to stabilize rotational movement of a shaft. The damper includes a cylindrical body with multiple chambers containing a viscous fluid and a rotor with multiple vanes rotatably mounted within the body. The rotor has a hollow cylindrical center with passages that allow communication of fluid during rotational movement between the compressing and expanding chambers. A centrally located and axially adjustable valve acts to restrict the flow of fluid through the passages and thereby adjust the damping effect of the damper.

4 Claims, 2 Drawing Sheets

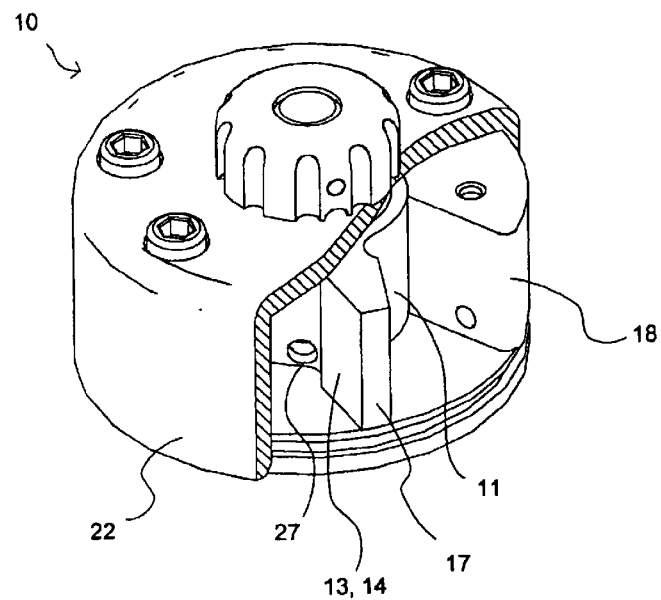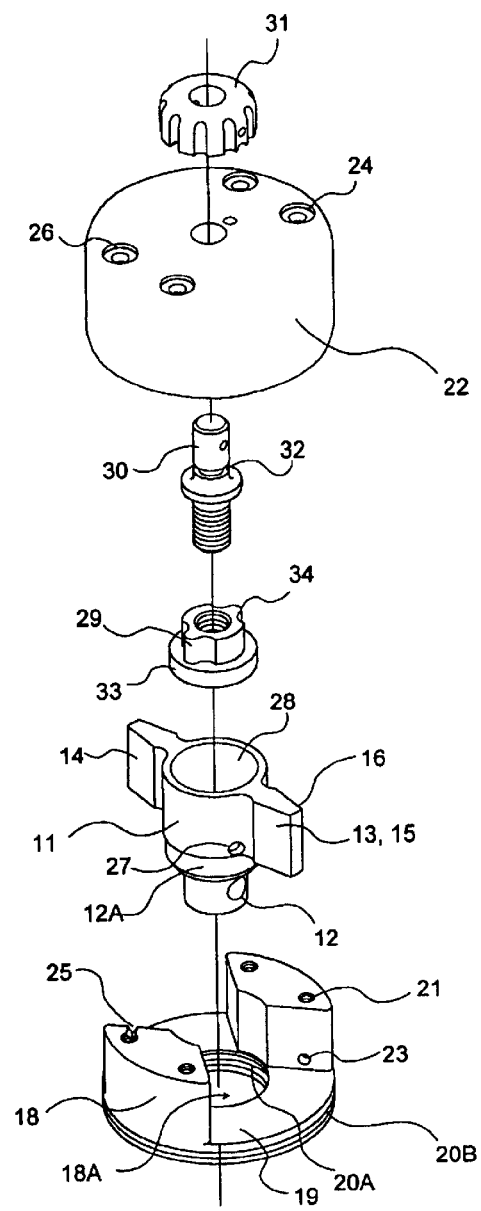
FIG. 1
FIG. 2

ROTARY DAMPER

CROSS REFERENCE TO RELATED APPLICATIONS

This applications claims the benefit of the filing date of the previously filed provisional application 60/339,801 "Rotary Steering Stabilizer".

BACKGROUND OF THE INVENTION

Rotary dampers, such as the one described in U.S. Pat. No. 4,411,341 have been used to dampen movement in a variety of applications from automobile suspensions to motorcycle steering. These dampers typically operate by having chambers in a sealed body containing a viscous fluid; concentric with that body is a shaft with radially disposed sealed vanes protruding into and dividing each chamber. Damping is effected through rotation of the shaft connected to the vanes which forces the viscous fluid through restricting orifices of various designs and locations in the body. Most damper designs have been complex and bulky with many intricate parts to maintain or fail.

BRIEF SUMMARY OF THE INVENTION

The present invention is a rotary damper which provides an effective, lightweight and inexpensive means to restrict and regulate flow between the chambers. The damper uses a rotor with a hollow center and passages that allow flow between chambers through the center of the rotor. Regulation is accomplished by means of a centrally located valve that is vertically adjustable by means of a threaded shaft operable by a knob on the top of the damper. This arrangement significantly reduces the complexity and weight of the damper.

Accordingly, it is an object of the present invention to simplify and lighten the rotary damper for use in applications where weight is a significant design parameter, such as racing motorcycles.

Other objects and advantages of the present invention will be apparent from the following description, the accompanying drawings and the appended claims.

BRIEF DESCRIPTION OF THE DRAWINGS

FIG. 1 is a perspective view in partial section of the damper

FIG. 2 is a perspective view of a damper exploded to show the elements of the preferred embodiment

DESCRIPTION OF THE PREFERRED EMBODIMENT

Figure 3:
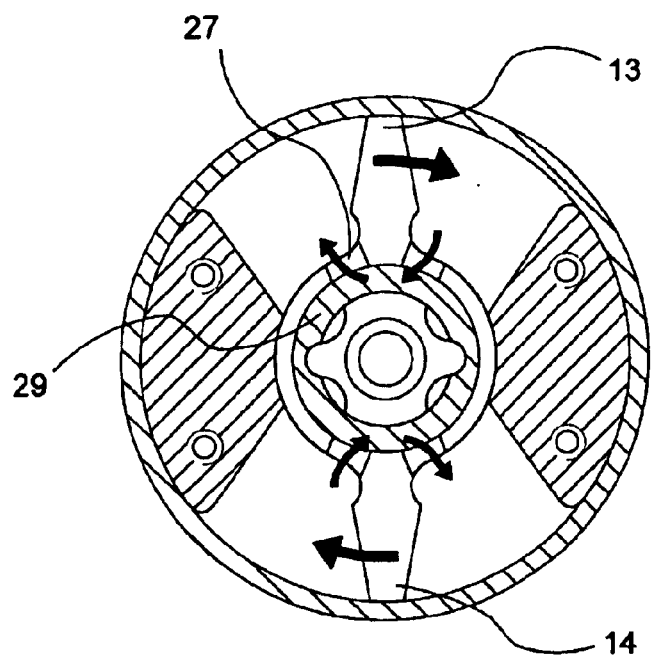

As shown in FIGS. 1 and 2, the rotary damper of the present invention is generally designated at 10. The damper 10 includes a rotor 11 with means at the lower end 12 for connection to the first component of the assembly to be damped. The rotor 11 includes a number (two are shown, more are contemplated) of radial outwardly extending vanes 13, 14 consisting of front and rear faces 15, 16 and an outer, arcuate edge 17.

The inner body 18 has a number of chambers 19 equal to the number of vanes on the rotor 11. Each vane 13,14 divides each chamber 19 into two discrete volumes, one compressing fluid and one expanding as the rotor 11 rotates. The inner body 18 has a central hole 18A in its lower portion for the base of the rotor 12 to protrude through and provision for o-rings around the inner circumference 20A of hole 18A for sealing against rotor 12 at surface 12A. Another o-ring is provided for sealing in the outer surface of inner body 18 at 20B to allow sealing against the inside of the outer shell 22.

Threaded holes 21 are provided in the inner body 18 for securing an outer shell 22. A hole 23 is provided in the inner body 18 that communicates with of one of the bolt holes 21 in the inner body 19 to allow introduction of a viscous fluid into the chambers after the damper is assembled. Removal of a bolt or screw at 24 will allow fluid to be poured into the damper, and with means at 25 to allow air to escape during the filling process by removing another bolt at 26.

Rotor 11 has a concentric cylindrical cutout 28 that extends down just below a plurality of orifices 27. As shown in FIG. 3 said orifices 27 are located on opposite sides of each vane 11 to provide for communication of fluid through the center of the rotor 11 as it rotates. Rotation of rotor 11 causes the viscous fluid to be forced out from the compressing chamber through orifice 27 into the center of the rotor 11 and then into the expanding chamber(s) on the opposite side of vanes 13,14.

The outer shell 22 is machined to provide close tolerances between the rotor 11 and the inner body 19 and when assembled provides a sealed unit that allows fluid to flow only through orifices 27 from one chamber to another (through the center of the rotor 28).

Changes in damping effect could be attained by varying the viscosity of the fluid in the damper or by changing the size of the orifices 27.

The preferred embodiment contemplates a centrally located flow regulator 29 that is machined to fit tightly inside the cylindrical cutout 28 of the rotor 11. This regulator 29 can be adjusted vertically by means of a threaded shaft 30 that is turned by a knob 31 on top of the damper. The shaft 30 is sealed by means of an o-ring at 32. The regulator 29 has a cylindrical surface on its circumference at 33 that will move vertically up and down blocking a portion and therefore reducing or increasing the size of the orifices 27 thereby causing variation in the damping effect.

Figure 4:
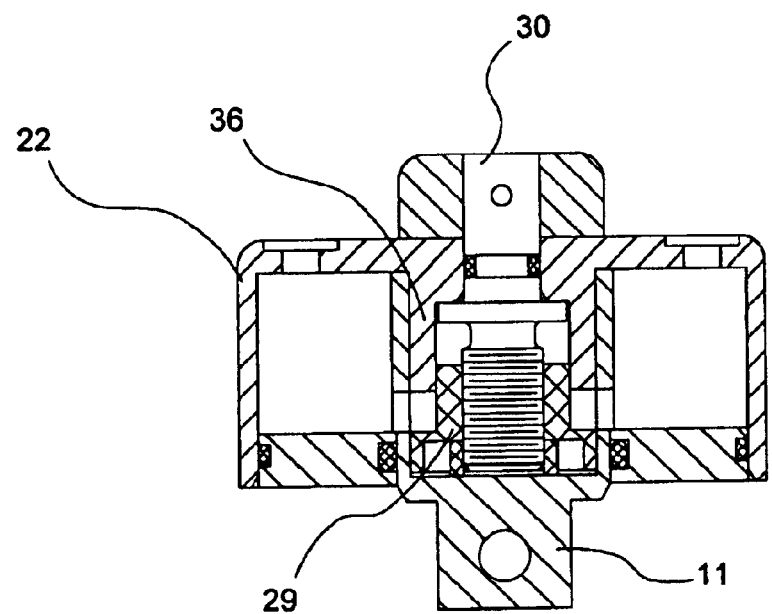

As shown in FIG. 1 and also with reference to FIG. 4, the regulator 29 has a machined profile 34 that fits inside a matching profile 35 inside a centrally located and downwardly protruding portion 36 of the outer shell 22 that allows vertical movement of regulator 29 but prevents rotation of the regulator 29 during adjustment.

What I claim is:

1. A rotary damper which comprises:
   a. an inner body with a plurality of chambers, said chambers filled with a viscous fluid;
   b. a rotor rotatably mounted in said inner body, said rotor having a hollow center section and also having a number of vanes equal to the number of chambers in said inner body; said vanes dividing said chambers into compressing and expanding chambers; said rotor further having orifices that allow communication of said viscous fluid through the center of said rotor from said compressing chambers to said expanding chambers;
   c. an outer shell to cover said chambers to create a sealed unit; said outer shell having a centrally located, downwardly extending cylindrical section with a vertically oriented machined profile through the center of said cylindrical section;
   d. a regulator in the said hollow center section of said rotor; said regulator having an upwardly extending machined profile that engages said machined profile of said cylindrical section of said outer shell to allow for vertical adjustment of said regulator, said regulator also having means for restricting said orifices in said rotor;

e. means for adjusting said regulator.

2. The damper of claim 1 wherein said outer shell has means for adding viscous fluid to chambers.

3. The damper of claim 1 wherein said regulator is adjusted by means of a knob on top of said damper.

4. A rotary damper which comprises:

a. an inner body with a plurality of chambers, said chambers filled with a viscous fluid;

b. a rotor rotatably mounted in said inner body, said rotor having a hollow center section and a number of vanes equal to the number of chambers in said inner body, said vanes dividing said chambers further into compressing and expanding chambers; said rotor further having orifices that allow communication of said viscous fluid through the center of said rotor from said compressing chambers to said expanding chambers;

c. an outer shell to seal said chambers, said outer shell further having means for adding viscous fluid to said damper; said outer shell having a centrally located, downwardly extending cylindrical section with a vertically oriented machined profile through the center of said cylindrical section;

d. a vertically adjustable regulator in the said hollow center of said rotor, said regulator having an upwardly extending machined profile that engages said machined profile of said cylindrical section of said outer shell to allow for vertical adjustment of said regulator, said regulator also having means for restricting said orifices in said rotor;

e. a threaded shaft rotatably mounted to said outer shell and coupled to said regulator; rotation of said threaded shaft causing vertical motion of said regulator and thereby adjusting the damping characteristics of said damper.

* * * * *